US010136037B1

(12) United States Patent
Keenan et al.

(10) Patent No.: US 10,136,037 B1
(45) Date of Patent: Nov. 20, 2018

(54) GLARE VISOR FOR SECURITY CAMERAS

(71) Applicant: Kuna Systems Corporation, Burlingame, CA (US)

(72) Inventors: Sean Keenan, Sunnyvale, CA (US); Noah Washington, San Mateo, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 0 days.

(21) Appl. No.: 15/498,866

(22) Filed: Apr. 27, 2017

Related U.S. Application Data

(63) Continuation of application No. 15/214,866, filed on Jul. 20, 2016, now Pat. No. 9,992,389, which is a continuation of application No. 14/859,867, filed on Sep. 21, 2015, now Pat. No. 9,654,678, which is a continuation of application No. 14/164,540, filed on Jan. 27, 2014, now Pat. No. 9,143,741, which is a continuation-in-part of application No. 13/921,597, filed on Jun. 19, 2013, now Pat. No. 9,172,917, and a continuation of application No. 14/205,946, filed on
(Continued)

(51) Int. Cl.
*H04N 5/225* (2006.01)
*G03B 11/04* (2006.01)
*H04N 5/232* (2006.01)
*H04N 7/18* (2006.01)
*G06T 7/33* (2017.01)
*G06T 7/50* (2017.01)
*G08B 13/196* (2006.01)

(52) U.S. Cl.
CPC ......... *H04N 5/2252* (2013.01); *G03B 11/045* (2013.01); *G06T 7/337* (2017.01); *G06T 7/50* (2017.01); *G08B 13/19619* (2013.01); *H04N 5/2253* (2013.01); *H04N 5/2254* (2013.01); *H04N 5/2256* (2013.01); *H04N 5/23238* (2013.01); *H04N 7/183* (2013.01)

(58) Field of Classification Search
CPC .... H04N 5/2252; H04N 7/183; H04N 5/2253; H04N 5/23238; H04N 5/2256; H04N 5/2254; G08B 13/19619; G06T 7/50; G06T 7/337; G03B 11/045
See application file for complete search history.

(56) References Cited

U.S. PATENT DOCUMENTS 3,909,107 A * 9/1975 Numbers ............... G02B 23/16
 396/534
8,280,241 B1 * 10/2012 Chang .................. G03B 11/045
 396/448
(Continued)

OTHER PUBLICATIONS

Paul van Waltree, "Lens Hood", 2002, 6 pages, https://web.archive.org/web/20161227220119/http://toothwalker.org/optics/lenshood.html.

*Primary Examiner* — Gevell Selby
(74) *Attorney, Agent, or Firm* — Christopher P. Maiorana, PC (57) ABSTRACT

An apparatus comprising a camera sensor and a lens hood. The camera sensor may be configured to capture video data of an environment near the apparatus. The lens hood may be configured to reduce an amount of glare from a light source. A lens effect results in a distortion of the video data captured by the camera sensor. An edge of the lens hood comprises a curvature corresponding to the distortion resulting from the lens effect.

20 Claims, 10 Drawing Sheets

Related U.S. Application Data

Mar. 12, 2014, now Pat. No. 9,542,832, and a continuation of application No. 14/519,642, filed on Oct. 21, 2014, and a continuation of application No. 14/504,632, filed on Oct. 2, 2014, and a continuation of application No. 14/664,275, filed on Mar. 20, 2015, now Pat. No. 9,726,338.

(60) Provisional application No. 62/328,827, filed on Apr. 28, 2016, provisional application No. 61/790,865, filed on Mar. 15, 2013, provisional application No. 61/783,474, filed on Mar. 14, 2013, provisional application No. 61/684,310, filed on Aug. 17, 2012, provisional application No. 61/923,931, filed on Jan. 6, 2014, provisional application No. 61/783,565, filed on Mar. 14, 2013, provisional application No. 61/902,943, filed on Nov. 12, 2013, provisional application No. 62/166,968, filed on May 27, 2015, provisional application No. 62/197,322, filed on Jul. 27, 2015, provisional application No. 62/240,862, filed on Oct. 13, 2015.

(56) References Cited

U.S. PATENT DOCUMENTS

| | | | |
|---|---|---|---|
| 2003/0197807 A1* | 10/2003 | Wu | H04N 5/2256 348/375 |
| 2005/0146641 A1* | 7/2005 | Cheng | H04N 5/2256 348/373 |
| 2017/0212413 A1* | 7/2017 | Seaton | G03B 17/566 |

* cited by examiner

GLARE VISOR FOR SECURITY CAMERAS

This application relates to (i) U.S. Provisional Ser. No. 62/328,827, filed Apr. 28, 2016, and also (ii) U.S. Ser. No. 15/214,866, filed Jul. 20, 2016, which relates to U.S. Ser. No. 14/859,867, filed Sep. 21, 2015, which relates to U.S. Ser. No. 14/164,540, filed Jan. 27, 2014, now U.S. Pat. No. 9,143,741, which relates to U.S. Ser. No. 13/921,597, filed Jun. 19, 2013, now U.S. Pat. No. 9,172,917, which relates to (i) U.S. Provisional Application No. 61/790,865, filed Mar. 15, 2013, (ii) U.S. Provisional Application No. 61/783,474, filed Mar. 14, 2013, and (iii) U.S. Provisional Application No. 61/684,310, filed Aug. 17, 2012. U.S. Ser. No. 14/164,540, filed Jan. 27, 2014 also relates to U.S. Provisional Application No. 61/923,931, filed Jan. 6, 2014. U.S. Ser. No. 14/859,867, filed Sep. 21, 2015, also relates to U.S. Ser. No. 14/205,946, filed Mar. 12, 2014, now U.S. Pat. No. 9,542,832, which relates to U.S. Provisional Application No. 61/783,565, filed Mar. 14, 2013. U.S. Ser. No. 14/859,867, filed Sep. 21, 2015, also relates to U.S. Ser. No. 14/519,642, filed Oct. 21, 2014, which relates to U.S. Provisional Application No. 61/902,943, filed Nov. 12, 2013. U.S. Ser. No. 14/859,867, filed Sep. 21, 2015, also relates to U.S. Ser. No. 14/504,632, filed Oct. 2, 2014. U.S. Ser. No. 14/859,867, filed Sep. 21, 2015, also relates to U.S. application Ser. No. 14/664,275, filed Mar. 20, 2015. U.S. Ser. No. 14/859,867, filed Sep. 21, 2015, also relates to U.S. Provisional Application No. 62/166,968, filed May 27, 2015. U.S. Ser. No. 15/214,866, filed Jul. 20, 2016 also relates to U.S. Provisional Application No. 62/197,322, filed Jul. 27, 2015. U.S. Ser. No. 15/214,866, filed Jul. 20, 2016 also relates to U.S. Provisional Application No. 62/240,862, filed Oct. 13, 2015. Each of the mentioned applications are hereby incorporated by reference in their entirety.

FIELD OF THE INVENTION

The invention relates to security cameras generally and, more particularly, to a method and/or apparatus for implementing a glare visor for security cameras.

BACKGROUND

Stray light entering a lens can cause glare when recording video or still images. Glare causes a reduction in video quality. In particular, in a dark environment glare from stray light or sunlight can cause a "washed out" effect that makes details difficult to see. Glare can be reduced using a visor to block stray light.

Conventional glare protection using visors does not take into account a shape of the lens. In particular, when a wide angle lens is used the recorded video or still images have a distorted wide angle lens effect. The wide angle lens produces an image that is curved on the top. Conventional visors assume straight edges on all 4 sides of the recorded image. Conventional visors block stray light by using a flat edge design. Using conventional visors with a wide angle lens results in too much glare due to stray light coming in at the top between the straight edge of the conventional visor and the curved image captured using the wide angle lens.

It would be desirable to implement a glare visor for security cameras.

SUMMARY

The invention concerns an apparatus comprising a camera sensor and a lens hood. The camera sensor may be configured to capture video data of an environment near the apparatus. The lens hood may be configured to reduce an amount of glare from a light source. A lens effect results in a distortion of the video data captured by the camera sensor. An edge of the lens hood comprises a curvature corresponding to the distortion resulting from the lens effect.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a glare visor for security cameras that may (i) correspond to a distortion due to a wide angle lens effect, (ii) block stray light (e.g., sunlight), (iii) not obstruct incoming light for the pyramidal light cone of a wide angle lens, (iv) be implemented as a part of a security camera, (v) be flush mounted and/or (vi) reduce glare.

The apparatus may provide significant glare protection when recording video and/or still images (e.g., video data). In an example, the apparatus may be implemented as part of a security light implementing a light source (e.g., a LED bulb) near a camera. In another example, the smart security light may operate in daylight and there may be sunlight providing a light source. The apparatus may reduce an amount of glare caused by stray light from the light source (e.g., the LED bulb, sunlight, lightning, other lights, etc.) by adding a curve to the bottom of the visor with a curvature similar to a distortion curve of the lens.

Figure 1:
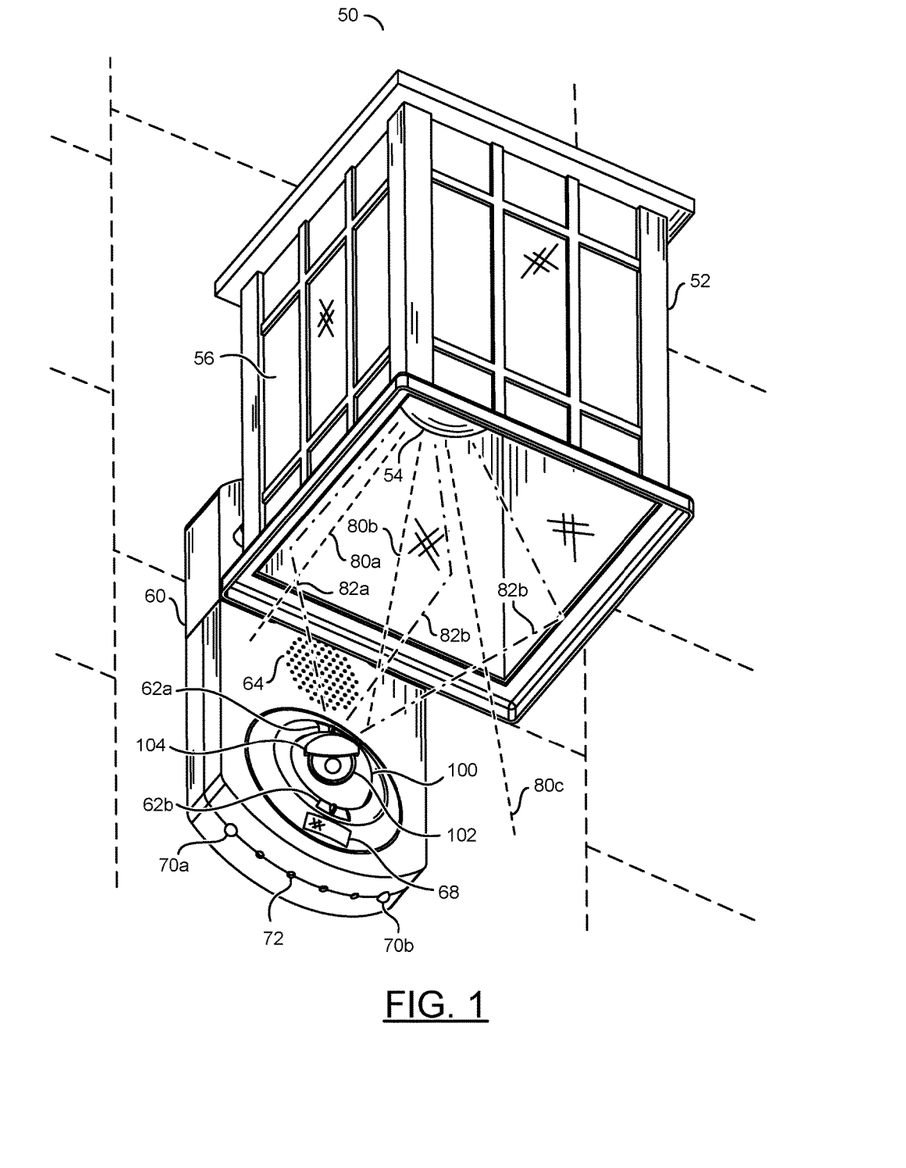
FIG. 1 is a diagram illustrating a security light implementing an embodiment of the present invention.

Referring to FIG. 1, a diagram illustrating a security light 50 implementing an embodiment of the present invention is shown. The security light 50 may comprise a light shade 52 and a base 60. The light shade 52 may comprise a diffusing medium 56. For example, the diffusing medium 56 may comprise sections of diffused glass (or diffused plastic, or another non-opaque material). The light shade 52 may further optionally comprise a light source 54. The light source 54 may be a light bulb. The light bulb 54 may be replaceable. The light bulb 54 may be implemented using an incandescent light bulb, a compact fluorescent lamp (CFL) bulb and/or an LED bulb. The type and/or style of the light bulb 54 may be varied according to the design criteria of a particular implementation. The light source 54 may also be from stray light, such as sunlight.

The base 60 may comprise adjustment grips 62a-62b, a speaker grille 64, an IR sensor lens 68, indicator LEDs 70a-70b, a microphone grille 72 and a camera sensor module 100 (e.g., a lens module). The camera sensor module 100 may comprise a lens 102 and a lens cover 104. The camera sensor module 100 may comprise a camera sensor located behind the lens 102. The camera sensor module 100 may be configured to record video and/or images. For example, the camera sensor module 100 may comprise a rectangular CMOS camera sensor configured to capture video data. The camera sensor module 100 may capture video data of an environment near the security light 50.

The light bulb 54 is shown generating light. The light from the light bulb 54 may be stray light. Stray light may be light that causes glare when the camera sensor module 100 records video and/or images. For example, the stray light may be light that enters the lens 104 but is not light used to illuminate a video frame (e.g., a chief ray, a principle ray, etc.) captured by the camera sensor module 100. The stray light is represented as stray light beams 80a-80n from the light bulb 54. The chief ray (or principle ray, or b ray) may be a ray of light starting at an edge of an object and passes through a center of an aperture of the lens 102 (e.g., a distance between the chief ray and the optical axis of an image location may define a size of the captured image). The stray light is further represented as stray light beams 82a-82n reflected off the diffused glass 56. For example, the stray light 80a-80n may be light from the light bulb 54 directed into the lens 102. In another example, the stray light 82a-82n may be from the diffused glass 56 diffusing light from all angles into the lens 102. The stray light 82a-82n from the diffusive medium 56 may contribute significantly to glare. The stray light 80a-80n and/or 82a-82n may also be from sunlight.

Figure 2:
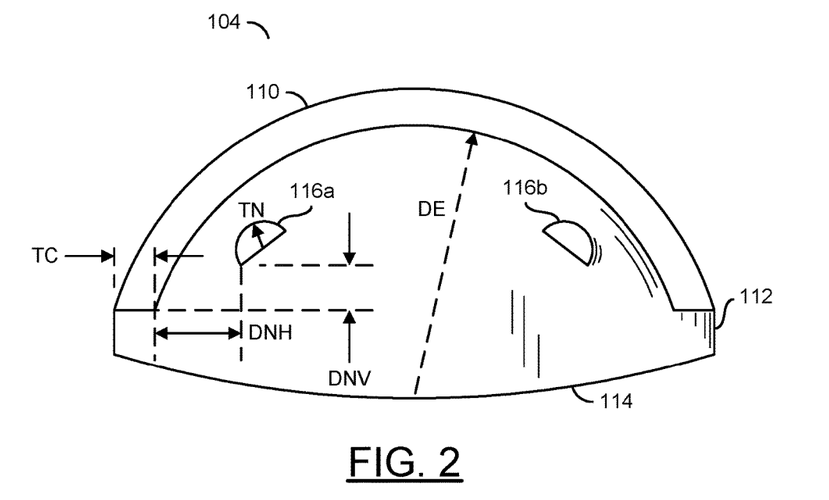
FIG. 2 is a diagram illustrating a lens hood.

Referring to FIG. 2, a diagram illustrating the lens hood 104 is shown. The lens hood 104 may comprise a section 110, a section 112, an edge 114 and connectors 116a-116b. The lens hood 104 is shown as a flush mounted embodiment. For example, the lens hood 104 may be attached to the lens 102 (or the camera sensor module 100) and sit flush over the lens 102.

The section 110 may be a fastening lip. For example, the fastening lip 110 may extend from the portion 112 to fit over a rim of the lens 102. The fastening lip may have a rounded shape to fit onto the rounded shape of the rim of the lens 102.

The section 112 may be the flush mounted face of the lens hood 104. The flush mounted face 112 may cover a portion of the lens 102. The portion of the lens 102 covered by the flush mounted face 112 may block the stray light 80a-80n and/or 82a-82n. The portion of the lens 102 covered by the flush mounted face 112 may not block the chief light ray received by the lens 102. For example, the chief light ray may enter the portion of the lens 102 that is not covered by the flush mounted face 112.

The edge 114 is shown as a bottom portion of the flush mounted face 112 of the lens hood 104. The bottom edge 114 is shown having a curved shape. The curvature of the bottom edge 114 may correspond to the distortion resulting from the lens effect of the wide angle lens 102. For example, the bottom edge 114 is shown bowed downwards such that the middle section of the bottom edge 114 is lower than the outside of the bottom edge 114. For example, the curvature of the bottom edge 114 may have a convex curve shape. The curvature of the bottom edge 114 may block the stray light 80a-80c and/or 82a-82c (e.g., the light rays causing the glare). For example, the curvature of the bottom edge 114 may block as much of the stray light 80a-80c and/or 82a-82c as possible without interfering with the chief ray.

The connectors 116a-116b may be configured to attach the lens hood 104 relative to the lens 102 (and the CMOS camera sensor of the camera sensor module 100). In the example shown, the connectors 116a-116b may be implemented as two friction clips. In another example, the connectors 116a-116b may be implemented as an adhesive. In yet another example, the connectors 116a-116b may be implemented using a set screw. In some embodiments, instead of implementing the connectors 116a-116n, the lens hood 104 may be molded onto the camera sensor module 100. For example, when the lens hood 104 is molded onto the camera sensor module 100, producing the lens hood 104 may be simplified (e.g., fewer parts) and/or errors due to incorrectly mounting the lens hood 104 to the lens 102 and/or the camera sensor module 100 may be reduced. The implementation of the connectors 116a-116b and/or the number of connectors implemented may be varied according to the design criteria of a particular implementation.

The friction clips 116a-116b may fasten the lens hood 104 to the lens 102 (or the camera sensor module 100). The friction clips 116a-116b and the fastening lip 110 may reduce movement of the lens hood 104 when secured over the lens 102. The friction clips 116a-116b may enable the lens hood 104 to be removed and/or re-attached to the camera sensor module 100 (e.g., a top portion of the lens 102).

A dimension TC is shown. The dimension TC may be a thickness of the fastening lip 110. A dimension DNH is shown. The dimension DNH may be a distance from the inside of the fastening lip 110 to the friction clip 116a. A dimension DNV is shown. The dimension DNV may be a distance from a bottom of the fastening lip 110 to the friction clip 116a. A dimension TN is shown. The distance TN may be a thickness of the friction clips 116a-116b. A dimension DE is shown. The distance DE may be a distance from the bottom of the curvature of the bottom edge 114 to the bottom of the fastening lip 110. The distances TC, DNH, DNV, TN and/or DE may be varied according to the design criteria of a particular implementation. The distance DE may be calculated based on the distortion effect.

Figure 3:
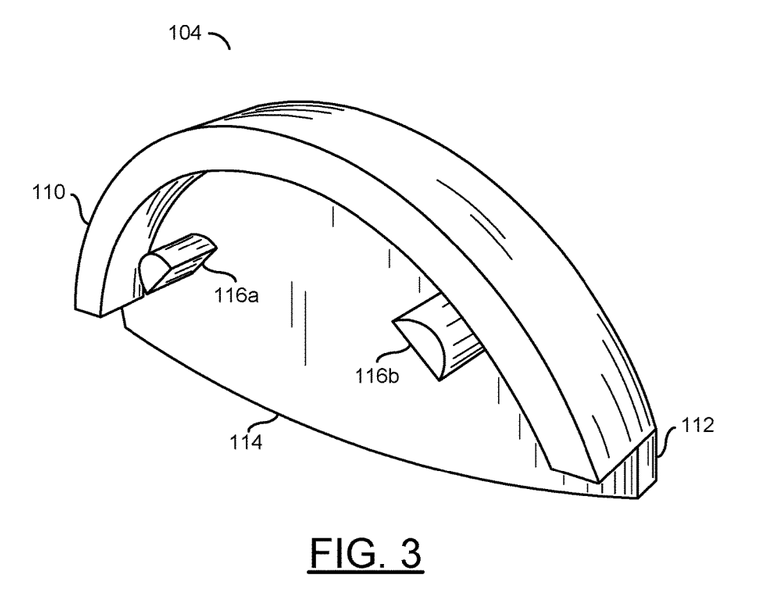
FIG. 3 is a diagram illustrating an alternate view of a lens hood.

Referring to FIG. 3, a diagram illustrating an alternate view of the lens hood 104 is shown. The alternate view of the lens hood 104 may provide an isometric view. The fastening lip 110 is shown extending from the flush mounted face 112. The friction clips 116a-116b are shown extending from the flush mounted face 112.

In the example shown, the curvature of the edge 114 of the lens hood 104 may be designed for a lens 102 that produces a wide angle lens effect. The wide angle lens effect may result in a barrel distortion. Details of the barrel distortion may be described in association with FIG. 6. The curvature of the edge 114 may be designed such that when an image is captured by the camera sensor module 100, the lens hood 104 may stay outside the captured image. For example, the curvature of the edge 114 may be shaped such that the lens hood 104 is as close to the captured image frame as possible without entering the image frame. In some embodiments, the camera sensor may capture a margin (or padded area). The padded area may be a portion of an image captured by a CMOS sensor that may be cropped out before the final output image (e.g., the final output image may not comprise the padded area). In some embodiments, the lens hood 104 may be captured in the padded area of the captured image, but not in the final output image. Generally, the curvature of the edge 114 of the lens hood 104 may be directly proportional to the curvature caused by the distortion of the lens effect.

Figure 4:
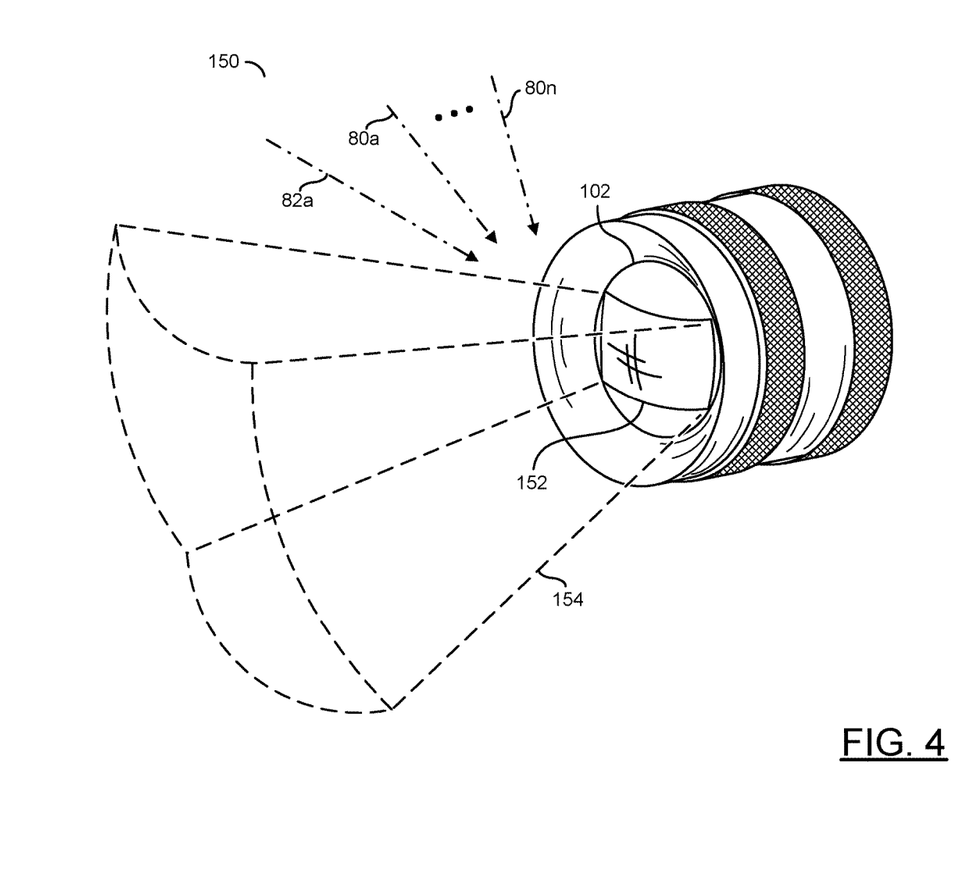
FIG. 4 is a diagram illustrating an example pyramidal light cone for a wide angle lens.

Referring to FIG. 4, a diagram illustrating an example 150 of a pyramidal light cone for the wide angle lens 102 is shown. The lens 102 is shown having an aperture 152. The aperture 152 may be a wide angle aperture. The aperture 152 is shown having curved edges caused by the wide angle lens distortion. For example, the aperture 152 may be generally rectangular, but the edges may bow inwards towards a middle of the aperture 152. In another example, the edges may bow outwards away from the middle of the aperture 152.

A pyramidal light cone 154 for the wide angle lens 102 is shown. The pyramidal light cone 154 may be used to illuminate the captured video (or image) frame for the video data. The pyramidal light cone 154 may represent the light from the environment near the security light 50 that enters the lens 102. For example, the pyramidal light cone 154 may be the chief ray received by the lens 102. The pyramidal light cone 154 may have a shape that generally conforms to the curved lens distortion caused by the wide angle lens 102. For example, a top edge of the pyramidal light cone 154 is shown having a shape that is curved inwards, similar to the aperture 152. In another example, the top edge of the pyramidal light cone 154 may have a shape that is curved outwards.

At full aperture, going from the lens 102 out towards an infinite distance, the pyramidal light cone 154 may start out circular in shape at the front element and converts to a rectangular cross section at some distance. At small apertures, and depending on the design, the cross section of the pyramidal light cone 154 may already be rectangular at a position of the front element (e.g., the lens 102). The distortion caused by the lens effect used to determine the curvature of the bottom edge 114 of the lens hood 104 may be based on a shape of the pyramidal light cone 154 at a particular distance from the camera sensor module 100.

The stray light 80a-80n and/or 82a-82n is shown directed towards the lens 102. The stray light 80a-80n and/or 82a-82n may cause glare that interferes with a viewing of the video frame illuminated by the pyramidal light cone 154. Generally, the pyramidal light cone 154 entering the lens 102 is desirable and the stray light 80a-80n and/or 82a-82n may be undesirable. For example, without the lens hood 104, the stray light 80a-80n and/or 82a-82n may enter the lens 102 (e.g., cause glare and/or interfere with a quality of the captured image).

Figure 5:
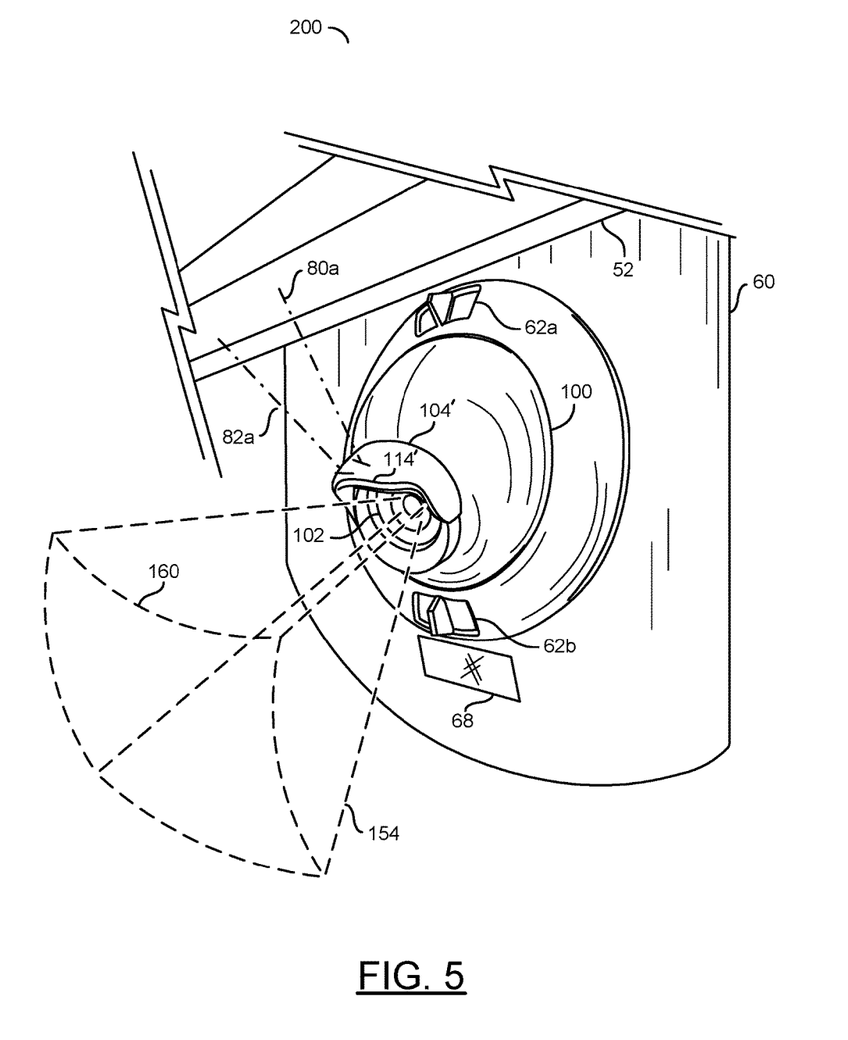
FIG. 5 is a diagram illustrating a lens hood allowing light of a pyramidal light cone into a lens and blocking stray light.

Referring to FIG. 5, a diagram 200 illustrating the lens hood 104' allowing light of the pyramidal light cone 154 into the lens 102 and blocking the stray light 80a and 82a is shown. The lens hood 104' is shown extending outwards from the lens 102. In some embodiments, the lens hood 104' may implement a visor (or baseball cap) style design. The lens hood 104' is shown blocking the stray light rays 80a and/or 82a. By blocking the stray light rays 80a and/or 82a, the lens hood 104' may reduce an amount of glare visible on recorded video frames.

The lens hood 104' is shown allowing the pyramidal light cone 154 to enter to the lens 102 without obstructing or distorting the pyramidal light cone 154. For example, the pyramidal light cone 154 may be the chief ray. The curved edge 114' of the lens hood 104' may have a shape generally similar to a top edge 160 of the pyramidal light cone 154. The curvature of the curved edge 114' may block the stray light 80a-80n and/or 82a-82n while allowing the light corresponding to the environment (e.g., the pyramidal light cone 154) to reach the camera sensor. The top edge 160 of the pyramidal light cone 154 may be bowed inwards. The top edge 160 of the pyramidal light cone and/or the curved edge 114' of the lens hood 104' may have a curvature corresponding to the distortion of the lens effect. For example, the curved edge 114' may conform to the lens distortion as the pyramidal light cone 154 projects forward.

Figure 6:
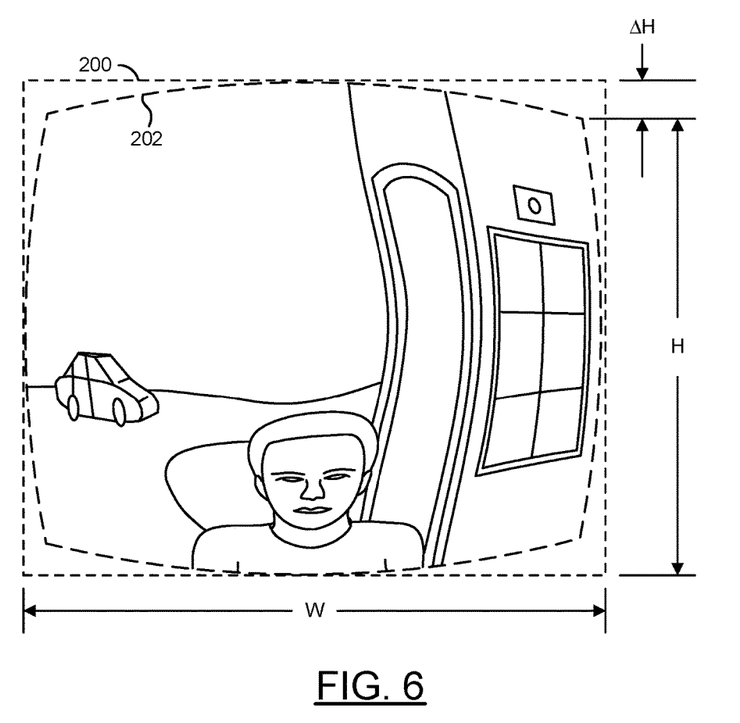
FIG. 6 is a diagram illustrating a distortion caused by a wide angle lens effect.

Referring to FIG. 6, a diagram illustrating a distortion caused by a wide angle lens effect is shown. A reference rectangle 200 is shown. The reference rectangle 200 may represent a shape of a video frame from a lens without the lens distortion effect caused by the wide angle lens 102. A distorted video frame 202 is shown. The distorted video frame 202 may be a video frame captured by the wide angle lens 102. The distorted video frame 202 may represent video data captured by the camera sensor having the distortion resulting from the lens effect. The distortion caused by the wide angle lens 102 may be a barrel distortion. For example, various objects shown in the distorted video frame 202 may be highly distorted as a result of the distortion caused by the wide angle lens 102 (e.g., objects appear stretched away from and/or bulging from a center of the distorted video frame 202). In some embodiments, the security light 50 may implement a processor configured to remove the distortion effects caused by the wide angle lens 102 for the output video frames.

The distorted video frame 202 may be stretched outwards along the edges. The middle of each edge of the distorted video frame 202 may bow outwards (e.g., have a convex shape). For example, the center of each edge of the distorted video frame 202 is shown touching (or nearly touching) a corresponding edge of the reference frame 200. The outward stretching of the edges of the video frame 202 may be caused by the barrel distortion of the wide angle lens 102.

A dimension (e.g., W), a dimension (e.g., H) and a dimension (e.g., ΔH) are shown. The dimension W may represent a width of the distorted video frame 202. The dimension H may represent a height of the distorted video frame 202. The dimension ΔH may represent a height of the curvature of the distorted video frame 202.

In some embodiments, the lens 102 may be measured with Recording Industry Association of America (RIAA) TV distortion. Measuring the lens 102 with RIAA TV distortion may be used to determine a ratio for determining the curvature of the edge 114 of the lens hood 104. A distortion (e.g., DTV) may be determined by an equation (e.g., EQ1):

$$DTV = 100 * \Delta H / H \qquad (EQ1)$$

Generally, an aspect ratio (e.g., A) of an image is known. In one example, the aspect ratio A may be 16/9. In another example, the aspect ratio A may be 4/3. The width W may be determined by an equation (e.g., EQ2):

$$W = A * H \qquad (EQ2)$$

Relevant measurements for the lens hood 104 may be determined by calculating ΔH' (e.g., the height of the curvature of the edge 114 at a pre-determined distance from the lens 102). The width W' may be measured. The width W' may represent the width of the image at a distance the lens hood 104 is placed at (e.g., how far away from the lens 102 that the lens hood 104 is located). Combining EQ1 and EQ2 for calculations at a pre-determined distance may result in an equation (e.g., EQ3):

$$DTV=100*\Delta H/(W/A)=100*\Delta H'/(W'/A) \quad (EQ3)$$

The height ΔH' of the curvature of the edge 114 of the lens hood 104 at a pre-determined distance from the lens 102 may be calculated using an equation (e.g., EQ4):

$$\Delta H'=W'*DTV/(100*A) \quad (EQ4)$$

The value ΔH' may be used to determine the dimensions of the lens hood 104. The value ΔH' may be used as a radius of the curvature of the edge 114 of the lens hood 104. For example, the curvature of the edge 114 of the lens hood 104 may be a segment of a full circle (e.g., if the curvature of the edge 114 is conceptually extended to create a full circle). The radius of the curvature of the edge 114 (e.g., determined based on EQ4) of the lens hood 104 may correspond to a radius of the full circle (e.g., a conceptual circle extended from the curvature of the edge 114).

Figure 7:
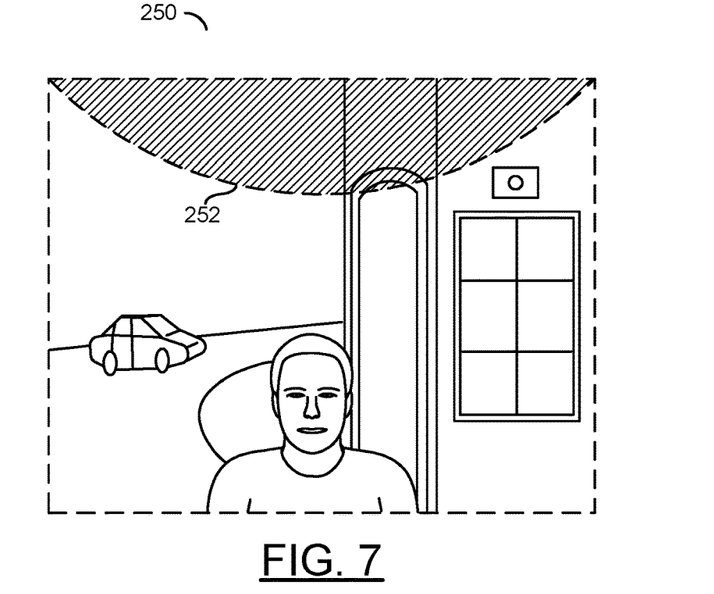
FIG. 7 is a diagram illustrating glare in a recorded video captured with a wide angle lens using a conventional lens hood.

Referring to FIG. 7, a diagram illustrating glare in a recorded video 250 captured with the wide angle lens 102 using a conventional lens hood is shown. The recorded video frame 250 may be an example of an output video frame. For example, the distortion caused by the wide angle lens 102 may have been reduced and/or eliminated by the processor implemented by the security light 50.

Glare 252 is shown at the top of the output video 250. The glare 252 may be a result of the stray light 80a-80n and/or 82a-82n entering the lens 102. The glare 252 is shown reducing a visibility and/or clarity of the video frame 250. An amount of the video frame 250 having the glare 252 may be a large amount (e.g., approximately one third of the video frame 250 may have the washed out effect). For example, the large amount of glare 252 may be a result of not implementing the lens hood 104 as shown in FIG. 4. In the example shown, the glare 252 has a curved shape. Generally, the glare 252 may have various patterns, shapes and/or differing amounts of glare throughout the video frame 250. The glare 252 may vary as lighting conditions change.

Figure 8:
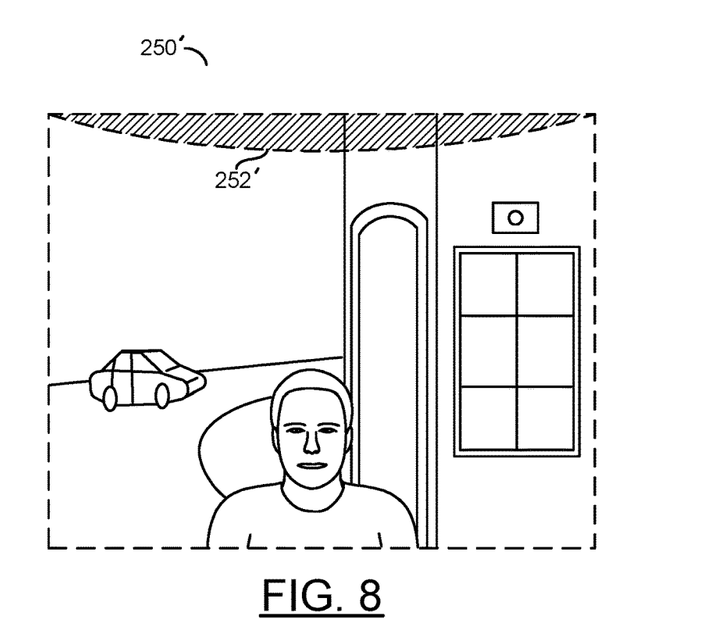
FIG. 8 is a diagram illustrating glare in a recorded video captured with a wide angle lens using a lens hood configured to correspond to the distortion from a lens effect.

Referring to FIG. 8, a diagram illustrating glare in a recorded video 250' captured with the wide angle lens 102 using the lens hood 104 is shown. The recorded video frame 250' may be an example of an output video frame. For example, the distortion caused by the wide angle lens 102 (e.g., as shown in association with FIG. 6) may have been reduced and/or eliminated by the processor implemented by the security light 50.

Glare 252' is shown at the top of the output video 250'. The glare 252' may be a result of the stray light 80a-80n and/or 82a-82n entering the lens 102. The glare 252' is shown reducing a visibility and/or clarity of the video frame 250'. An amount of the video frame 250' having the glare 252' may be a relatively small amount (e.g., compared to the glare 252 in the video frame 250 shown in association with FIG. 7). For example, the small amount of glare 252' may be a result of implementing the lens hood 104' as shown in FIG. 5. The lens hood 104' may block some (or all) of the stray light 80a-80n and/or 82a-82n. Blocking the stray light 80a-80n and/or 82a-82n may reduce (or eliminate) the amount of the glare 252'. Even with the lens hood 104 blocking the stray light 80a-80n and/or 82a-82n, some stray light may still enter the lens 102 resulting in the small amount of glare 252'. The video frame 250' having the reduced glare 252' may have improved clarity (e.g., appear less washed out).

Figure 9:
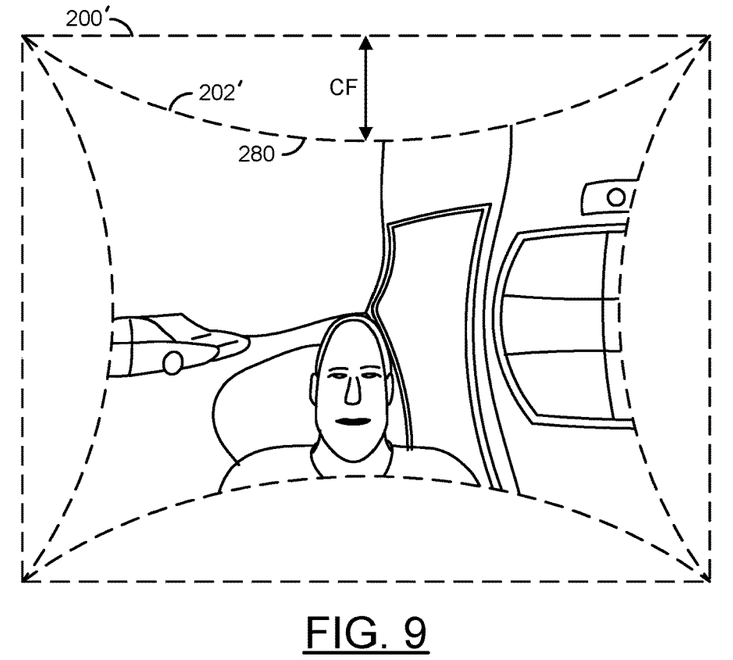
FIG. 9 is a diagram illustrating a pincushion distortion effect.

Referring to FIG. 9, a diagram illustrating a pincushion distortion effect is shown. A reference rectangle 200' is shown. The reference rectangle 200' may represent a shape of a video frame from a lens without (or corrected for) the lens distortion effect caused by the lens 102. A distorted image 202' is shown. In some embodiments, the distorted image 202' may be a video frame captured by the lens 102. The distorted image 202' may represent video data captured by the camera sensor having the distortion resulting from the lens effect.

The distortion caused by the lens 102 may be a pincushion distortion. In one example, the pincushion distortion effect may be caused by a telephoto lens. For example, various objects shown in the distorted image 202' may be highly distorted as a result of the distortion caused by the lens 102 (e.g., objects appear stretched towards and/or sucked into a center of the distorted image 202'). In some embodiments, the security light 50 may implement a processor configured to remove the pincushion distortion effects caused by the lens 102 for the output video frames.

In some embodiments, the distorted image 202' may be a pre-designed image. For example, the distorted image 202' may be a manufacturer supplied lens quality measurement chart. In some embodiments, the pincushion distortion of the distorted image 202' may be implemented to counteract the barrel distortion caused by the wide angle lens 102. In the example shown, the distorted image 202' may be an image of a person. In another example, the distorted image 202' may comprise markings. The markings on the distorted image may comprise lines, curves, scales, geometric shapes and/or numbers.

The markings of the distorted image 202' may be used to determine a quality and/or distortion caused by the lens 102 and/or to determine a quality of the distortion correction performed by the processor of the camera sensor module 100. For example, the distorted image 202' may be held centered in front of the lens 102. One of the markings of the distorted image 202' may be a curve 280. The curve 280 may be a top edge curve for the distorted image 202'. In some embodiments, when the wide-angle lens 102 generates the barrel distortion effect, the distorted image 202' may appear properly/proportional (e.g., similar to the video frame 250 shown in association with FIG. 7) when no distortion correction is applied by the camera sensor module 100 (e.g., the pincushion effect of the distorted image 202' may negate the barrel distortion caused by the lens 102).

The top edge curve 280 may be a curve at the top of the distorted image 202'. The top edge curve 280 may represent an amount of the distortion caused by the lens effect. The other sides of the distorted image 202' may have a similar amount of distortion represented by curved markings. The top edge curve 280 may appear as a straight line (e.g., a horizontal line) framing the captured video when the distortion correction is applied to the distorted image 202' (e.g., similar to the top line of the reference frame 200').

A distance (e.g., CF) is shown between the largest point of the top edge curve 280 and the reference video frame 200'. The distance CF may represent an amount of the lens distortion effect caused by the wide angle lens 102. The curved edge 114 of the lens hood 104 may have a curvature corresponding to the top edge curve 280 of the distorted image 202'. For example, a shape of the curved edge 114 may be based on the distance (e.g., radius) CF. Generally, the stray light 80a-80n and/or 82a-82n resulting from an operation of the security light 50 may come from above the lens 102. Since the stray light 80a-80n and/or 82a-82n comes from above, the lens hood 104 may be implemented to conform to the shape of the top edge curve 208 of the distorted image 202'. Since the lens hood 104 conforms to the shape of the top edge curve 202' of the distorted image 202' and the top edge curve 202' corresponds to the distortion effect caused by the lens 102, the curved edge 114 of the lens hood 104 may frame (e.g., be located just outside of) the output video frames generated by the camera sensor module 100.

To determine the radius of the curvature of the edge 114, the distorted image 202' may be centered in front of the lens 102. The final output image from the camera sensor module 100 may have distortion correction applied. For example, when centered in front of the lens 102, the distorted image 202' may appear rectangular (e.g., similar to the video frame 250 shown in association with FIG. 7). When the distortion correction is applied, the curved lines framing the distorted image 202' (e.g., the top edge curve marking 280 and the curves along the sides and the bottom) may be barely in view. In some embodiments, the top edge curve marking 280 may be in the padding area captured by the camera sensor and cropped out of the final output image. The lens hood 104 may be designed to match the curvature of the top edge curve 280.

The top edge curve 280 may be a hyperbola. Since the amount of distortion caused by the lens 102 may be small, the hyperbola may be estimated as a circle. Estimating (e.g., modeling and/or simplifying) the hyperbola shape of the top edge curve 280 as a circle may reduce a difficulty of production of the lens hood 104. In some embodiments, where the distortion caused by the lens 102 is significant (e.g., a full fish-eye lens), then matching the hyperbola shape of the top edge curve 280 may be more important. A radius of the circle used to estimate the top edge curve 280 may be determined by measuring the curve as a circular segment. The ratio of the circular segment and/or the radius of the circle used as a simplified model of the top edge curve 280 may be recreated to design the shape of the curvature of the edge 114 of the lens hood 104.

Figure 10:
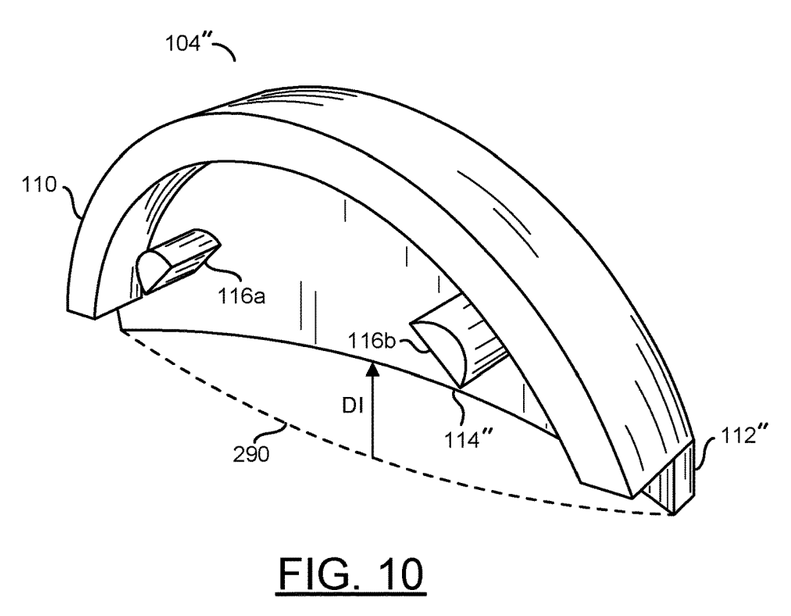
FIG. 10 is a diagram illustrating a curvature for a lens hood designed for a pincushion effect.

Referring to FIG. 10, a diagram illustrating a curvature for the lens hood 104" designed for a pincushion effect is shown. The lens hood 104" may comprise the fastening lip 110, the flush mounted face 112", the edge 114" and/or the friction clips 116a-116b. The fastening lip 110 and/or the friction clips 116a-116n may have a similar implementation as described in association with FIG. 2.

The edge 114" may have an inverted curvature (e.g., compared to the edge 114 described in association with FIG. 2). The edge 114" may have a concave shape. A reference line 290 is shown. For example, the reference line 290 may represent a straight line across the lowest points of the edge 114" A distance DI is shown. The distance DI may represent a distance from the reference line 290 to the deepest point of the concave curvature of the edge 114". For example, the distance DI may represent a depth of the curvature of the inverted edge 114".

In some embodiments, the lens 102 may cause a pincushion distortion effect. For example, the distorted image 202', described in association with FIG. 9, may have the pincushion distortion effect. The inverted edge 114" may be designed to reduce the glare 252 when the lens 102 causes the pincushion distortion effect. The inverted edge 114" may be configured to reduce the glare 252 while remaining outside of the final output video frame generated by the camera sensor module 100. The concave shape of the inverted edge 114" may be designed to block the stray light 80a-80n and/or 82a-82n from entering the lens 102.

Figure 11:
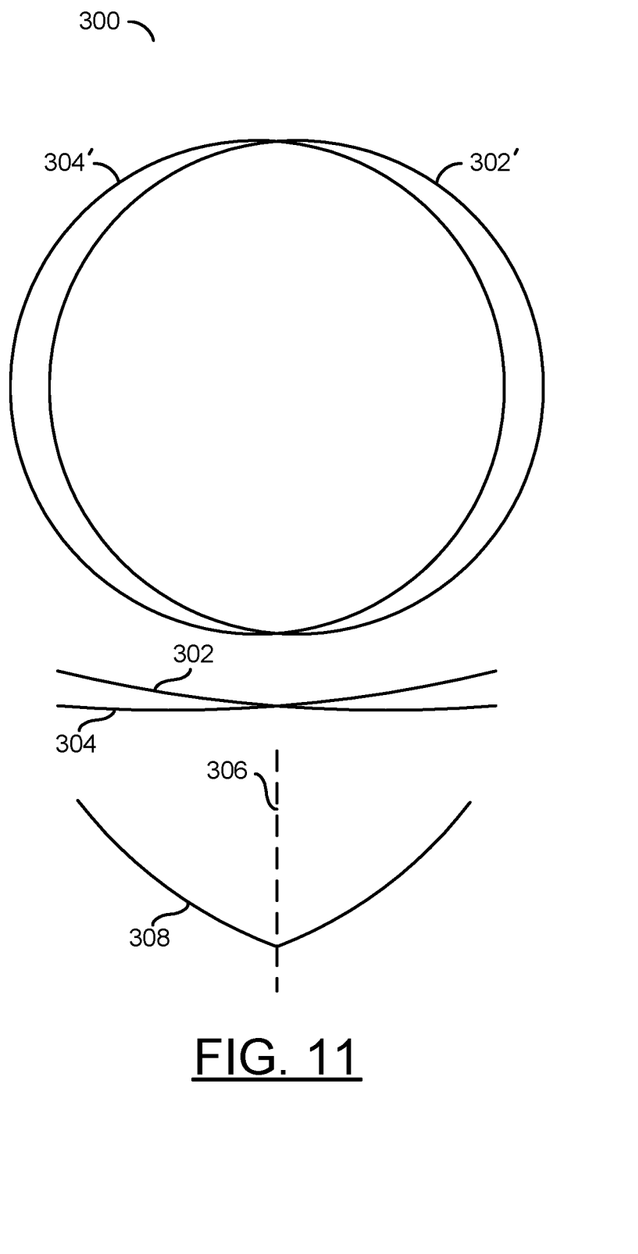
FIG. 11 is a diagram illustrating a horizontal offset.

Referring to FIG. 11, a diagram illustrating a horizontal offset 300 is shown. The lens hood 104 may comprise a vertical offset and/or a horizontal offset (e.g., shift). The vertical offset of the lens hood 104 may be determined based on an accuracy of mounting the lens hood 104 vertically with respect to the CMOS sensor of the module 100. The vertical offset may be determined irrespective of the curvature of the edge 114 of the lens hood 104.

The horizontal shift of the lens hood 104 compared to the CMOS sensor of the module 100 may be a correction that may not result in a single curve. In some embodiments, designing the lens hood 104 for the horizontal shift may comprise an overlap of two horizontally offset lens hood curvatures. The overlapping areas of the two horizontally offset lens hood curvatures may be used to design the curvature of the lens hood 104.

A circle 302' and a circle 304' are shown. The circle 302' and the circle 304' may be horizontally offset by a distance Δx. The horizontal offset 300 may comprise a curve 302 and a curve 304. The curve 302 may be a portion of the circle 302'. The curve 304 may be a portion of the circle 304'. The curve 302 and the curve 304 may be two radii offset by the tolerance Δx. The curve 302 and the curve 304 may be horizontally offset.

A line 306 is shown. The line 306 may correspond to where the curve 302 and the curve 304 intersect. There may be an inflection point at the intersection point of the curve 302 and the curve 304. The less the curve 302 and the curve 304 overlap each other (e.g., the larger the value of Δx), the more pronounced the inflection point may be.

A curve 308 is shown. The curve 308 may be a combination of the curve 302 and the curve 304. The portion of the curve 308 left of the inflection point may be the curve 302 and the portion of the curve 308 right of the inflection point may be the curve 304. There may be a distribution of allowable horizontal offset for the lens 102. The distribution of allowable horizontal offset for the lens 102 may be a range of offsets having negative and positive values for Δx. For example, the lens 102 may be aligned with the line 306. When the lens 102 is aligned with the line 306, the lens 102 may be centered in the distribution of allowable offset. When the lens 102 is aligned with the curve 304, the lens 102 may be at maximum negative allowable offset (e.g., in the negative portion of the distribution of allowable horizontal offset). When the lens 102 is aligned with the curve 302, the lens 102 may be at maximum positive allowable offset (e.g., in the positive portion of the distribution of allowable horizontal offset).

If the lens 102 and/or camera sensor is aligned with the curve 304 (e.g., at the maximum negative allowable x offset), then the glare 252 may be reduced more effectively (e.g., maximally blocked) on a left side of the captured image than the right side of the captured image. Similarly, if the lens 102 and/or camera sensor is aligned with the curve 302 (e.g., at the maximum positive allowable x offset), then the glare 252 may be reduced more effectively (e.g., maximally blocked) on a right side of the captured image than the left side of the captured image. For example, the left curve 304 may be an optimal curve (e.g., most effective glare reduction) for the maximum negative x direction. In another example, the right curve 302 may be an optimal curve (e.g., most effective glare reduction) for the maximum positive x direction glare reduction. The optimal negative offset curve 304 may enter the field of view for the positive x offset on the right side of the captured image. The optimal positive offset curve 302 may enter the field of view for the negative x offset on the left side of the captured image. The overlapping areas of the curve 302 and the curve 304 may be used to design the curvature of the edge 114 of the lens hood 104.

Figure 12:
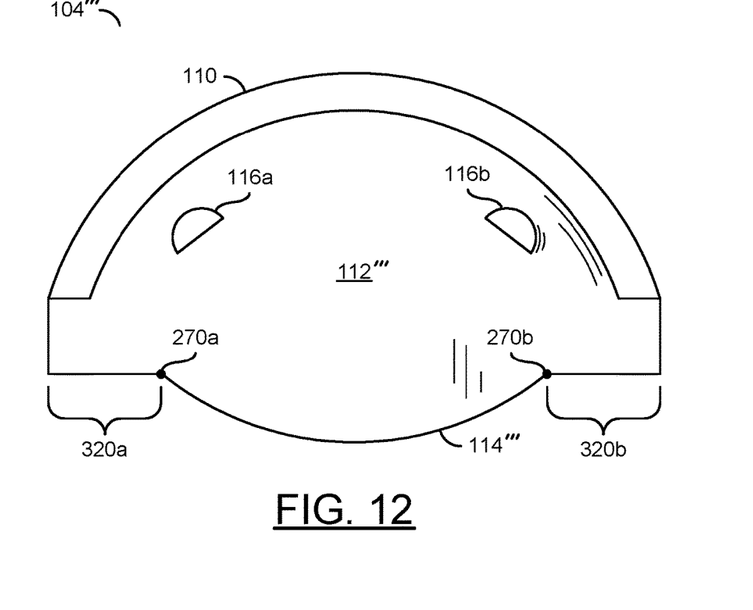
FIG. 12 is a diagram illustrating a lens hood having an example curvature.

Referring to FIG. 12, a diagram illustrating the lens hood 104''' having an example curvature is shown. The lens hood 104''' may comprise the fastening lip 110, the flush mounted face 112''', the edge 114''' and/or the friction clips 116a-116b. The fastening lip 110 and/or the friction clips 116a-116n may have a similar implementation as described in association with FIG. 2.

The curvature of the edge 114''' may comprise points 270a-270b. The points 270a-270b may comprise a location on the edge 114''' that intersects with the image (e.g., chief ray). Generally, the curvature of the edge 114''' between the points 270a-270b may be relevant to blocking the stray light 80a-80n and/or 82a-82n.

Portions 320a-320b are shown (e.g., a straight portion of the edge 114'''). The portions 320a-320b may be outside of the intersecting points 270a-270b. Since the portions 320a-320b are outside of the field of view of the lens 102, the portions 320a-320b may not be relevant to blocking the stray light 80a-80n and/or 82a-82n. The curved portion of the edge 114''' between the intersecting points 270a-270b may be off-center (e.g., offset horizontally). For example, the portions 320a-320b may be different sizes.

Figure 13:
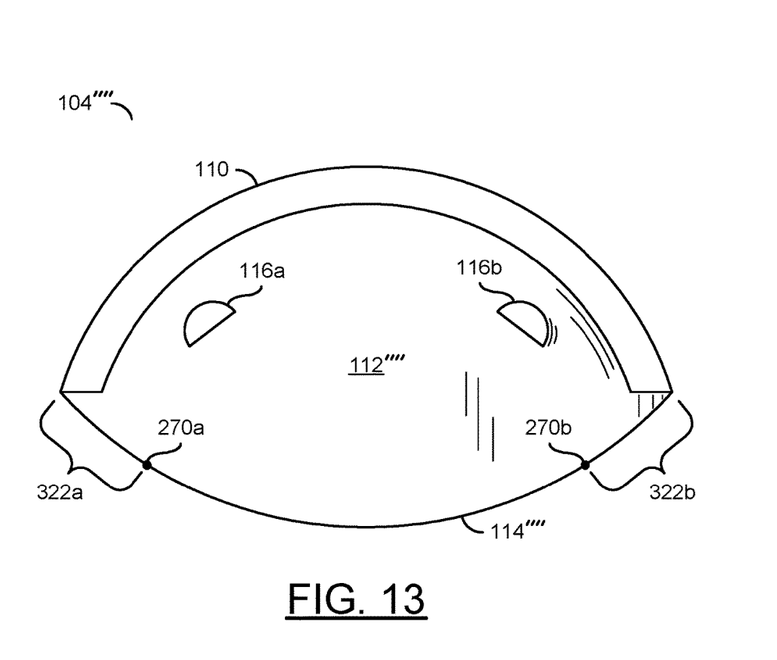
FIG. 13 is a diagram illustrating an alternate embodiment of a lens hood having a curvature with aesthetic portions.

Referring to FIG. 13, a diagram illustrating an alternate embodiment of the lens hood 104'''' having a curvature with aesthetic portions is shown. The lens hood 104'''' may comprise the fastening lip 110, the flush mounted face 112'''', the edge 114'''' and/or the friction clips 116a-116b. The fastening lip 110 and/or the friction clips 116a-116n may have a similar implementation as described in association with FIG. 2.

The curvature of the edge 114'''' may comprise points 270a-270b. The points 270a-270b may comprise a location on the edge 114'''' that intersects with the image (e.g., a chief ray). Generally, the curvature of the edge 114'''' between the points 270a-270b may be relevant to blocking the stray light 80a-80n and/or 82a-82n.

Portions 322a-322b are shown. The portions 322a-322b may be outside of the intersecting points 270a-270b. Since the portions 322a-322b are outside of the field of view of the lens 102, the portions 322a-322b may not be relevant to blocking the stray light 80a-80n and/or 82a-82n. The portions 322a-322b may follow the curvature of the portion of the edge 114'''' between the image intersecting points 270a-270b. Since the portions 322a-322b may not be relevant to blocking the stray light 80a-80n and/or 82a-82n, the portions 322a-322b may be shaped to provide aesthetic appeal. The shape of the portions 322a-322b may be varied according to the design criteria of a particular implementation.

In the example shown, the lens hood 104'''' (shown in association with FIG. 13) may have the same effectiveness for reducing glare as the lens hood 104''' (shown in association with FIG. 12). For example, the differences in the shape of the edge 114''' and the shape of the edge 114'''' may be aesthetic. A distance between the friction clip 116a and the image intersection point 270a may be the same for the lens hood 104''' and the lens hood 104''''. Similarly, a distance between the friction clip 116b and the image intersection point 270b may be the same for the lens hood 104''' and the lens hood 104''''. Using the same distance between the fiction clips 116a-116b and the corresponding image intersection points 270a-270b may ensure that various designs of the lens hood 104 may effectively reduce glare while providing different aesthetic styles.

Figure 14:
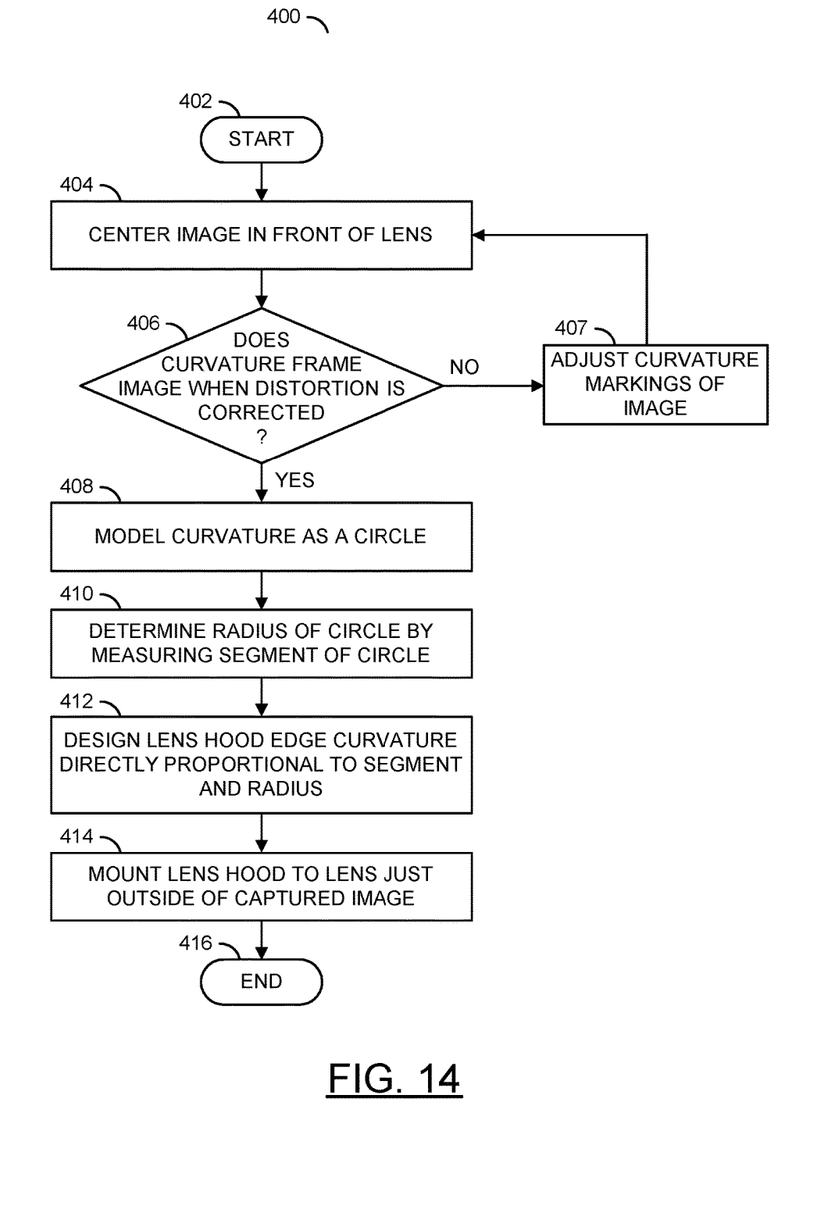
FIG. 14 is a diagram illustrating a method for designing a curvature for a lens hood.

Referring to FIG. 14, a method (or process) 400 is shown. The method 400 may determine a curvature for a lens hood. The method 400 generally comprises a step (or state) 402, a step (or state) 404, a decision step (or state) 406, a step (or state) 407, a step (or state) 408, a step (or state) 410, a step (or state) 412, a step (or state) 414, and a step (or state) 416.

The state 402 may start the method 400. In the state 404, a designer may center an image (e.g., the distorted image 202' having the curvature marking 280) in front of the lens 102. Distortion correction may be applied to the distorted image 202'. The distortion correction may correct the curvature marking 280 from a curve to a straight line. Next, the method 400 may move to the decision state 406.

In the decision state 406, the designer may determine whether the curvature marking 280 frames the final output image (e.g., the distortion corrected image) when the distortion is corrected (e.g., by a processor of the security light 50). If the curvature marking 280 does not frame the image when distortion correction is applied, the method 400 may move to the state 407. In the state 407, the curvature marking 280 of the image (e.g., the distorted image 202') may be adjusted (e.g., adjusted to frame the image when distortion correction is applied). Next, the method 400 may return to the state 404. In the decision state 406, if the curvature marking 280 does frame the image when distortion correction is applied the method 400 may move to the state 408.

In the state 408, the curvature marking 280 of the distorted image 202' may be modeled as a circle. For example, the curvature marking 280 may be a hyperbolic shape and the circle may be a simplified model (e.g., an approximation) of the hyperbolic shape (e.g., for easier design parameters). Next, in the state 410, the radius of the circle may be determined by measuring a segment of the circle (e.g., to determine the distance CF). In the state 412, the curvature of the edge 114 of the lens hood 104 may be designed to be directly proportional to the segment and/or radius measured. Next, in the state 414, the lens hood 104 may be mounted to the lens 102 such that the lens hood 104 remains just outside of the field of view of the captured image. Next, the method 400 may move to the state 416. The state 416 may end the method 400.

In some embodiments, the curvature of the edge 114 of the lens hood 104 may be designed by continually adjusting (e.g., iteratively adjusting) the curvature of the edge 114. For example, the curvature of the lens hood 104 may be adjusted until the lens hood 104 is barely in the field of view across the final output image. The edge 114 may be shaped by shaving off parts of the lens hood 104 to correspond to the vertical offset. In some embodiments, the lens edge 114 may have a curvature that may not be circular.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a camera sensor configured to capture video data of an environment near said apparatus; and
   a lens hood configured to reduce an amount of glare from a light source, wherein (i) a lens effect results in a distortion of said video data captured by said camera sensor, (ii) an edge of said lens hood comprises a curvature corresponding to said distortion resulting from said lens effect, (iii) said distortion is a pincushion distortion and (iv) said curvature of said edge of said lens hood is a concave shape.

2. The apparatus according to claim 1, wherein said curvature is configured to block light associated with said glare while allowing light corresponding to said environment to reach said camera sensor.

3. The apparatus according to claim 2, wherein said light corresponding to said environment is received by said camera sensor in a shape of a pyramidal light cone.

4. The apparatus according to claim 2, wherein said light corresponding to said environment is used to illuminate video frames for said video data.

5. The apparatus according to claim 1, wherein said light source is located above said apparatus.

6. The apparatus according to claim 5, wherein said lens hood is removably attached to a top portion of said apparatus.

7. The apparatus according to claim 6, wherein said edge comprises a bottom edge of said lens hood.

8. The apparatus according to claim 1, wherein said apparatus comprises a lens module.

9. The apparatus according to claim 1, wherein said distortion used to determine said curvature is based on a shape of a pyramidal light cone at a distance from said apparatus.

10. The apparatus according to claim 1, said apparatus is configured to implement a glare visor for a security camera.

11. An apparatus comprising:
    a shade portion configured to connect to a light source;
    a lens module comprising (i) a camera sensor configured to capture video data of an environment near said apparatus and (ii) a lens hood configured to reduce an amount of glare from said light source; and
    a base configured to enclose a circuit, said circuit configured to provide (i) an electrical connection to (a) said camera sensor, (b) components of said circuit and (c) said lens module, (ii) a connection between a power source and said light source and (iii) control signals for activation of (a) said light source, (b) said components of said circuit and (c) said camera sensor, wherein (A) said circuit comprises an antenna module configured to connect and send data to a network through a wireless connection, (B) said video data is sent as said data through said wireless connection, (C) a lens effect results in a distortion of said video data captured by said camera sensor, (D) an edge of said lens hood comprises a curvature corresponding to said distortion resulting from said lens effect, (E) said distortion is a pincushion distortion and (F) said curvature of said edge of said lens hood is a concave shape.

12. A method for reducing glare in video captured from a lens located below a light source, comprising the steps of:
    (A) determining a distortion caused by a lens based on an image, wherein (i) said image comprises markings that represent said distortion and (ii) one of said markings is a curvature that frames an image captured by said lens when (a) said image is centered in front of said lens and (b) said distortion is corrected;
    (B) modeling said curvature as a circle;
    (C) measuring a segment of said circle to determine a radius of said circle; and
    (D) designing a lens hood having an edge curvature directly proportional to said segment and said radius, wherein (i) said lens hood reduces an amount of glare entering said lens and (ii) said edge curvature of said lens hood is configured to stay outside of images captured using said lens.

13. The method according to claim 12, wherein (i) said distortion is a pincushion distortion and (ii) said edge curvature of said lens hood is a concave shape.

14. The method according to claim 12, wherein (i) said distortion comprises a barrel distortion and (ii) said barrel distortion is caused by a wide angle lens effect.

15. The method according to claim 14, wherein said distortion resulting from said wide angle lens effect comprises a curve at a top of said video.

16. The method according to claim 12, wherein said edge curvature is a convex curve.

17. The method according to claim 12, wherein said lens hood is configured to block light associated with said glare while allowing light corresponding to an environment near a camera sensor.

18. The method according to claim 17, wherein said light corresponding to said environment is used to illuminate video frames for said video.

19. The method according to claim 12, wherein said lens hood is removably attached to a top portion of said lens.

20. The method according to claim 12, wherein said lens hood is configured to implement a glare visor for a security camera.

* * * * *